United States Patent [19]

Hirano et al.

[11] Patent Number: 4,474,338

[45] Date of Patent: Oct. 2, 1984

[54] METHOD OF AND ARRANGEMENT FOR WRAPPING A STRIP SEGMENT OF RESILIENT MATERIAL

[75] Inventors: Masaki Hirano, Higashimurayama; Shoji Takahashi, Kodaira, both of Japan

[73] Assignee: Bridgestone Tire Company Limited, Tokyo, Japan

[21] Appl. No.: 342,806

[22] Filed: Jan. 26, 1982

[30] Foreign Application Priority Data

Jan. 27, 1981 [JP] Japan .................................. 56-10512

[51] Int. Cl.³ ...................... B65H 81/00; B29H 17/20
[52] U.S. Cl. ..................................... 242/55; 156/123; 156/405.1
[58] Field of Search .................. 156/405.1, 406.6, 406, 156/394.1, 130.3, 130.5, 130.7, 123 R; 242/55, 57, 67.1 R; 226/24

[56] References Cited

U.S. PATENT DOCUMENTS

| | | | |
|---|---|---|---|
| 1,209,161 | 12/1916 | Hoyt | 156/406.6 |
| 1,706,697 | 3/1929 | Lehman | 156/405.1 |
| 2,988,131 | 6/1961 | Frohlich et al. | 156/405.1 |
| 2,997,095 | 8/1961 | Trevaskis | 156/405.1 X |
| 3,721,809 | 3/1973 | Strandberg, Jr. et al. | 242/57 X |
| 3,728,181 | 4/1973 | Simmons, Jr. | 156/405.1 X |
| 3,898,116 | 8/1975 | Katagiri et al. | 156/406 X |
| 3,901,756 | 8/1975 | Wireman et al. | 156/123 X |

Primary Examiner—Stuart S. Levy
Assistant Examiner—Scott J. Haugland
Attorney, Agent, or Firm—Cushman, Darby & Cushman

[57] ABSTRACT

A method of and an arrangement for wrapping a strip segment of resilient material round a take-up device having an outer peripheral surface in which the strip segment of resilient material is advanced toward the take-up device at a travelling speed which is substantially equal to the rotational speed of the outer peripheral surface of the take-up device while the front or rear end portion of the strip segment is being wrapped on the outer peripheral surface. The travelling speed is, however, determined in such a manner that a difference between the length of the strip segment and the distance around the outer peripheral surface of the take-up device therefor zero value while the intermediate portion of the strip segment is being wrapped on the outer peripheral surface.

2 Claims, 6 Drawing Figures

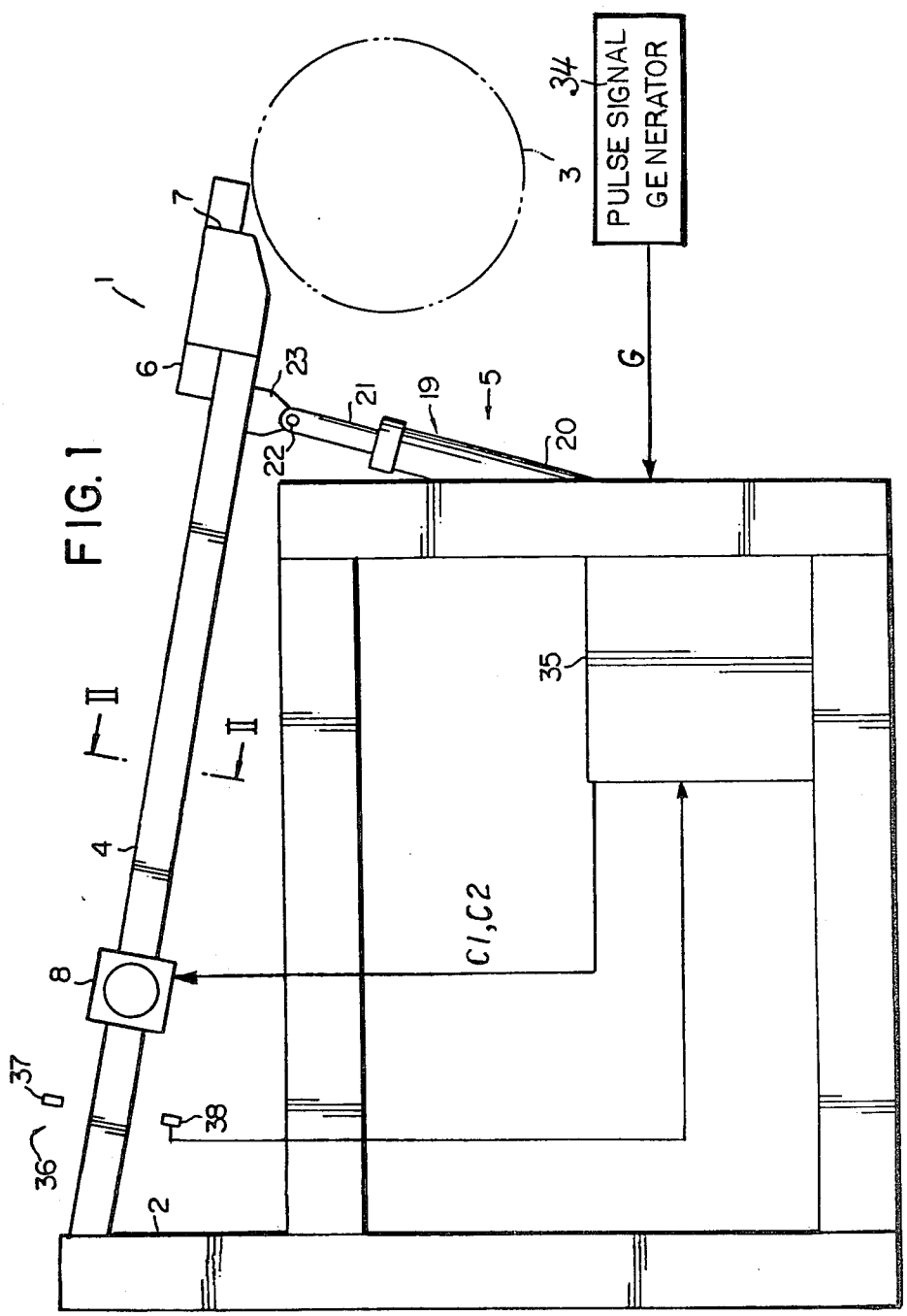

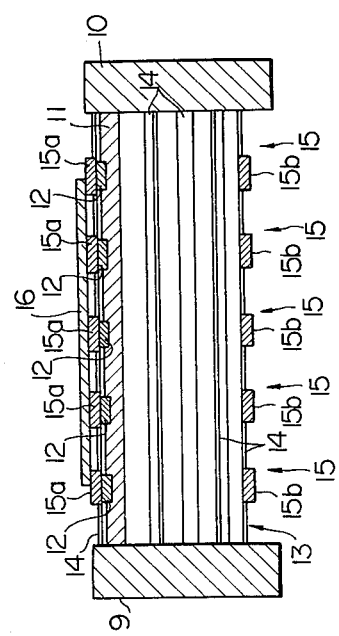
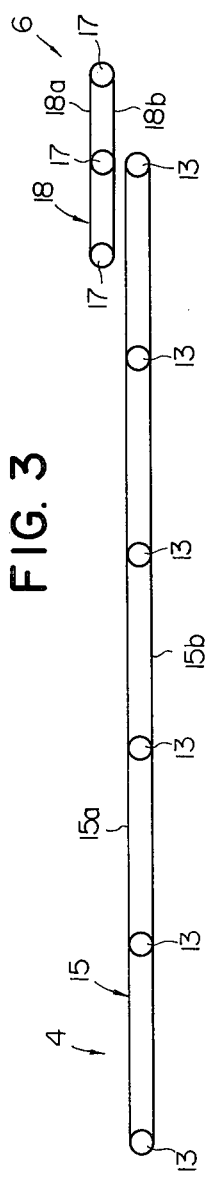

METHOD OF AND ARRANGEMENT FOR WRAPPING A STRIP SEGMENT OF RESILIENT MATERIAL

FIELD OF THE INVENTION

The present invention relates to a method of and an arrangement for wrapping a strip segment of resilient material round a take-up device.

BACKGROUND OF THE INVENTION

During manufacture of pneumatic rubber tires, for example, a plurality of strip segments of rubber are supplied in succession to a rotating tire-building drum serving as a take-up device and are wrapped in a ply-by-ply fashion round the drum. The strip segments of rubber thus fed to the rotating tire-building drum are constituted by a plurality of tire cord fabrics, belt plies reinforced with steel coads and a tire tread and ultimately form in combination on the drum an annular green tire. In order to form the green tire without application of manual operation, it has been proposed and put into practice to use various method of and arrangements for wrapping the strip segments of rubber round the tire-building drum.

The problem has been encountered in prior-art methods and arrangements in that each of the strip segments of rubber on the drum is liable to produce wrinkles and a slack when the front end of the strip segment is jointed to the rear end of the strip segment.

The present invention contemplates elimination of the problem inherent in the conventional methods of and arrangements for wrapping the strip segment on the drum.

SUMMARY OF THE INVENTION

In accordance with one outstanding aspect of the present invention, there is provided a method of wrapping a strip segment of resilient material round a take-up device so that a length of the strip segment and a distance around the outer peripheral surface of the take-up device are equal with each other, the strip segment of resilient material having a front end portion, rear end portion and an intermediate portion between the front and rear end portions, comprising the steps of measuring the length of the strip segment of resilient material for calculating a difference between the length of the strip segment of resilient material and the distance around the outer peripheral surface of the take-up device, advancing the strip segment of resilient material at the first speed substantially equal to the rotational speed of the outer peripheral surface of the rotating take-up device for wrapping the front end portion of the strip segment of resilient material on the outer peripheral surface of the rotating take-up device, advancing the strip segment of resilient material at the second speed for wrapping the intermediate portion of the strip segment of resilient material on the outer peripheral surface of the rotating take-up device in a expanded or contracted condition, the second speed being determined in such a manner that the difference between the length of the strip segment and the distance around the outer peripheral surface of the take-up device is reduced to zero value, and advancing the strip segment of resilient material at the third speed substantially equal to the rotational speed of the outer peripheral surface of the rotating take-up device for wrapping the rear end portion of the strip segment of resilient material on the outer peripheral surface of the rotating take-up device and causing the front end of the strip segment of resilient material to abut the rear end of the strip segment.

In accordance with another outstanding aspect of the present invention, there is provided an arrangement for wrapping a strip segment of resilient material round a take-up device so that a length of the strip segment and a distance around the outer peripheral surface of the take-up device are equal with each other, the strip segment of resilient material having a front end portion, a rear end portion and a intermediate portion between the front and rear end portions, comprising a transfer device operative to advance the strip segment of resilient material toward the rotating take-up device at a travelling speed, a measuring device operative to measure the length of the strip segment of resilient material and to produce a signal representative of the length of the strip segment of resilient material, a signal generating device operative to produce a signal representative of the rotational speed of the outer peripheral surface of the rotating take-up device, and a control device responsive to the signals respectively representative of the length of the strip segment of resilient material and the rotational speed of the outer peripheral surface of the rotating take-up device and operative to produce two modes of command signals respectively representative of first and second target travelling speeds of the strip segment of resilient material, the first target travelling speed of the strip segment of resilient material being equal to the rotational speed of the outer peripheral surface of the take-up device and the second target travelling speed being determined in such a manner that the difference between the length of the strip segment of resilient material and the distance around the outer peripheral surface of the take-up device is reduced to zero value when the strip segment of resilient material is wrapped on the outer peripheral surface of the rotating take-up device, wherein one of the command signals representative of the first target travelling speed is fed to the transfer device to vary the travelling speed of the strip segment of resilient material to a value substantially equal to that of the first target travelling speed while the front or rear end portion of the strip segment of resilient material is being wrapped on the outer peripheral surface of the rotating take-up device and wherein the other of the command signal representative of the second target travelling speed of the strip segment of resilient material is fed to the transfer device to vary the travelling speed of the strip segment of resilient material to a value substantially equal to that of the second target travelling speed during the intermediate portion of the strip segment of resilient material is wrapped on the outer peripheral surface of the rotating take-up device.

BRIEF DESCRIPTION OF THE DRAWINGS

The feature of a method and an arrangement according to the present invention will be more clearly understood from the following description taken in conjunction with the accompanying drawings in which:

FIG. 1 is a side view showing an embodiment of the arrangement according to the present invention;

FIG. 2 is an enlarged cross sectional view taken along the line II—II of FIG. 1, and showing a transfer device forming part of the arrangement shown in FIG. 1;

FIG. 3 is a side view showing the relation between a feed conveyor unit and a transfer conveyor unit each forming part of the transfer device of the arrangement shown in FIG. 1;

DESCRIPTION OF THE EMBODIMENTS

Figure 4:
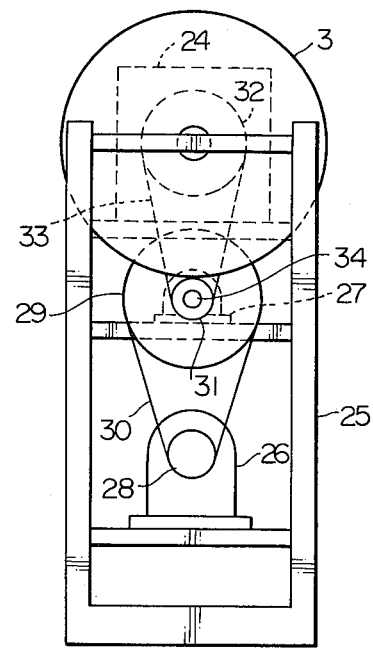
FIG. 4 is a side view showing a signal generating device forming part of the arrangement shown in FIG. 1 and a take-up device.

Referring to FIG. 1 of the drawings, a preferred embodiment of an arrangement according to the present invention is shown which comprises a transfer device 1 which is constituted by a stationary frame structure 2 disposed upstream of a rotatable tire-building drum 3 serving as a take-up device, a feed conveyor unit 4 rockably connected to the stationary frame structure 2 at the rear end portion thereof, an actuator unit 5 interposed between the stationary frame structure 2 and the front end portion of the feed conveyor unit 4 and operative to rock the feed conveyor unit 4 with respect to the stationary frame structure 2, a transfer conveyor unit 6 carried by means of a panel member 7 on the front end portion of the feed conveyor unit 4 so as to be rockable together with the feed conveyor unit 4 and a stepper motor 8 operative to put the feed conveyor unit 4 into operation at various speeds.

In FIG. 2 of the drawings, the feed conveyor unit 4 comprises a framework having a pair of side members 9 and 10 spaced apart in parallel from each other and rockably connected to the stationary frame structure 2 at the rear ends thereof. The framework forming part of the feed conveyor unit 4 further has a plurality of cross members 11 connected at both sides thereof to the upper end portions of the side members 9 and 10, respectively, and supporting thereon a plurality of permanent magnets 12 which are spaced apart substantially in parallel from one another and extend in longitudinal directions of the side members 9 and 10, respectively. Each of the permanent magnets 12 may be constituted by a plurality of magnet segments arranged at predetermined, regular or irregular intervals from one another in the longitudinal directions of the side members 9 and 10. The feed conveyor unit 4 further comprises a plurality of belt driving rollers 13 rotatably supported on the side members 9 and 10 and formed on the outer peripheral surface thereof with a plurality of teeth 14 circumferentially equi-angularly spaced apart from one another. Between the foremost and rearmost belt driving rollers 13 are passed and stretched a plurality of endless conveyor belts 15 each constituted by a synchronous belt formed with evenly spaced grooves which are periodically brought into meshing engagement with the teeth 14 of each belt driving rollers 13 to produce a positive, non-slip driving effect. One of the belt driving rollers 13 is a drive roller operatively connected to the stepper motor 8 which is adapted to drive the drive roller for rotation. The belt driving rollers 13, the endless conveyor belts 15 and the stepper motor 8 being thus arranged, each of the endless convleyor belts 15 is driven to travel between the rearmost and foremost belt driving rollers 13 at a speed and has an upper travelling path portion 15a directed toward the tire-building drum 3 and a lower travelling path portion 15b directed toward a strip segment feeder (not shown) positioned upstream of the feed conveyor unit 4. The permanent magnets 12 supported on the cross members 11 are exposed immediately underneath the lower surface of the upper travelling path portions 15a, respectively, so that the permanent magnets 12 magnetically attract a strip segment of rubber 16 reinforced with steel coads so as to enhance a non-slip effect between the endless conveyor belts 15 and the strip segment 16 when the strip segment 16 is fed on the upper travelling path portions 15a of the endless conveyor belts 15.

The transfer conveyor unit 6 forming part of the transfer device 1 comprises a plurality of belt driving rollers 17 one of which is a drive roller operatively connected to suitable drive means (not shown) causing endless conveyor belts 18 to travel at a speed equal to that of the endless conveyor belts 15. Each of the endless conveyor belts 18 passed and stretched between the foremost and rearmost belt driving rollers 17 has an upper and a lower travelling path portions 18a and 18b, the lower travelling path portion 18b of each endless conveyor belts 18 being directed toward the tire-building drum 3 and partially in registry with the upper travelling path portion 15a of each endless conveyor belts 15. The transfer conveyor unit 6 further comprises a plurality of permanent magnets (not shown) located close to the upper surfaces of the lower travelling path portions 18b. The feed conveyor unit 4 and the transfer conveyor unit 6 being thus arranged, the strip segment 16 of rubber reinforced with the steel coads is transferred from the upper travelling path portions 15a of the endless conveyor belts 15 to the lower travelling path portions 18b of the endless conveyor belts 18 when the strip segment 16 reaches the front end portions of the upper travelling path portions 15a.

Referring again to FIG. 1, the actuator unit 5 comprises a power cylinder 19 which has a cylinder body 20 pivotally connected to the stationary frame structure 2 through a spaced rear bracket member (not shown) and a piston rod 21 pivotally connected to the front end portions of the side members 9 and 10 by means of a pin 22 and a spaced front bracket member 23. The piston rod 21 is connected in the cylinder body 20 to a piston which forms two variable-volume chambers together with the cylinder body 20. Both of the variable-volume chambers are hydraulically connected to the suitable high pressure souce (not shown), respectively, so that the piston rod 21 is retracted and causes the lower travelling path portions 18b of the endless conveyor belts 18 to assume positions tangential to the outer peripheral surface of the tire-building drum 3 if a high pressure fluid is supplied from the suitable high pressure souce to one of the variable-volume chambers. On the other hand, the piston rod 21 is projected and causes the lower travelling path portions 18b of the endless conveyor belts 18 to assume positions forming a free space between the transfer conveyor unit 6 and the tire-building drum 3.

The tire-building drum 3 comprises a plurality of elements movable in radial directions of tire-building drum 3 and having arcuate outer surfaces, respectively, which form in combination the outer peripheral surface of the tire-building drum 3 as well known in the art. The tire-building drum 3 further comprises a plurality of permanent magnets each embedded in a portion close to the outer surface of each of the elements. The tire-building drum 3 being thus constructed and arranged, the strip segment 16 of rubber reinforced with the steel coads is prevented from movement with respect to the outer surface of the drum 3 when the strip segment 16 is transferred from the transfer conveyor unit 6 to the outer peripheral surface of the tire-building drum 3.

In FIG. 4 of the drawings, the tire-building drum 3 is rotatably supported through bearing units (not shown) on a pair of plate members 24 which are in turn supported on a stationary frame structure 25. On the stationary frame structure 25 is supported a motor unit 26 connected to a reduction gear unit 27 through a suitable transmitting device such as sprockets 28 and 29 and a endless chain 30. The reduction gear unit 27 is in turn connected to the tire-building drum 3 by means of a suitable transmitting device such as sprockets 31 and 32 and a endless chain 33. The motor unit 26 is electrically connected to a suitable power souce across a switch unit so that the tire-building drum 3 is driven for rotation through the transmitting device, reduction gear unit 27 and the transmitting device when the switch unit is closed. The reduction gear unit 27 has an output shaft to which a pulse signal generator 34 is connected. The pulse signal generator 34 serving as a signal generating device is operative to produce a pulse train (G) indicative of a rotational speed of the outer peripheral surface of the drum 3. The rotational speed of the tire-building drum need not to be a constant valve. The pulse signal generator 34 is electrically connected to a control device which is constituted by a control unit 35 (see in FIG. 1) comprising a desired total length register, a desired front length register, a desired rear length register, a measured total length register, a calculating module and a frequency modulation circuit in the embodiment according to the present invention.

A target sensor 36 serving as a measuring device is spaced apart a predetermined distance (D) rearwardly from the tire-building drum 3 and electrically connected to the control unit 35. In the embodiment shown in FIGS. 1 to 4, the target sensor 36 comprises, for example, an opto-coupler which is constituted by a light source 37 emitting a light beam and a light detector 38 collecting the light beam emitted from the light source 37. The light source 37 and the light detector 38 being positioned across a space formed between the endless conveyor belts 15, the target sensor 36 is adapted to produce an output signal while the strip segment 16 of rubber is breaking the light beam falling upon the light detector 38.

The desired total length register is adapted to register therein a desired total length of the strip segment 16 of the rubber wrapped on the drum 3 and to produce an output signal representative of the desired total length of the strip segment 16 on the drum 3, the desired total length of the strip segment 16 being substantially equal to the distance around the outer peripheral surface of the tire-building drum 3. The desired front length register is adapted to register therein a desired front length of the strip segment 16 of rubber wrapped on the drum 3 and to produce an output signal representative of the front length of the strip segment 16 on the drum 3. The desired rear length register is adapted to register therein a desired rear length of the strip segment 16 of rubber wrapped on the drum 3 and to produce an output signal representative of the desired rear length of the strip segment 16 on the drum 3. The measured total length register is adapted to count the number of pulses fed from the pulse signal generator 34 in the presence of the output signal fed from the target sensor 36 and to produce an output signal representative of a measured total length of the strip segment 16 on the feed conveyor unit 4. The measured total length register and the pulse signal generator 34 form not only part of the calculating device and the signal generating device, respectively, but also parts of the measuring device in the embodiment shown in FIGS. 1 to 4. In the calculating module, differences (A) and (B) between the measured total length and the desired total length of the strip segment 16 and between the desired total length and the desired front and rear lengths of the strip segment 16 are calculated from the output signals fed from the measured total length register, the desired total length register, the front length register and the rear length register, respectively. A value of the predetermined distance (D) being stored in the calculating module for producing an output signal indicating the predetermined distance (D), the calculating module further calculates a ratio (R1) between the differences (A) and (B) and a total distance (TD) adding the predetermined distance (D) to the desired front length of the strip segment 16 for producing output signals respectively representative of the ratio (R1) between the differences (A) and (B) and the total distance (TD) over which the endless conveyor belts 15 travel with the travelling speed equal to the rotational speed of the outer peripheral surface of the tire-building drum 3. The frequency modulation circuit is operative to produce two modes of command pulse trains (C1) and (C2) having frequencies different from each other and fed to the stepper motor 8, the frequency of the command pulse train (C1) being equal to that of the pulse train (G) fed from the pulse signal generator 34. Referring to a difference between a sum of pulses of the command pulse train (C2) fed to the stepper motor 8 in a certain period of time and a sum of pulses of the pulse train (G) fed from the pulse signal generator 34 in the same period of time as "difference (C)", the frequency of the command pulse train (C2) is determined in such a manner that the difference (C) and the sum of pulses of the pulse train (G) fed to the control unit 35 in the same period of time are in a ratio (R2) equal to the ratio (R1) between the differences (A) and (B). The frequency of the command pulse train (C2) being thus variable, the stepper motor 8 is also variable in rotational speed and causes the endless conveyor belts 15 and accordingly the endless conveyor belts 18 to vary in travelling speeds to certain values. The frequency of the command pulse train (C2) may be increased or decreased insofar as the strip segment 16 wrapped on the outer peripheral surface of the tire-building drum 3 does not have a length equal to the desired total length of the strip segment 16.

The transfer device 1 and the tire-building drum 3 described hereinbefore are constructed and arranged to transfer and wrap the strip segment 16 of rubber reinforced with the steel coads, respectively. It is, however necessary for the transfer device 1 and the tire-building drum 3 to have retaining means for retaining a strip segment without reinforcement of steel coads if the arrangement according to the present invention handles the strip segment without reinforcement of the steel coads such as a tire tread. Such retaining means may be constituted by a plurality of pressing rollers or a plurality of vacuum cups located along the endless conveyor belts 15 and 18 and around the outer peripheral surface of the tire-building drum 3. The pressing rollers or vacuum cups may be movable together with the endless conveyor belts 15 and 18 or the tire-building drum 3 for preventing the strip segment of rubber to move with respect to the endless conveyor belts 15 and 18 or the outer surface of the tire-building drum 3.

In operation, the desired total length, the desired front length and the desired rear length are registered in the desired total length register, desired front length register, and the desired rear length register for producing the output signals, respectively. The high pressure fluid is supplied into one of the variable-volume chambers formed in the cylinder body 20 so as to retract the piston rod 21 and cause the lower travelling path portions 18b of the endless conveyor belts 18 to move into the positions tangential to the outer peripheral surface of the tire-building drum 3 before the motor unit 26 is actuated to start. When the motor unit 26 is actuated to start, the reduction gear unit 27 and accordingly the tire-building drum 3 are driven for rotation at the respective speeds. The pulse signal generator 34 is connected to the reduction gear unit 27 so that the pulse signal generator 34 are driven for rotation together with the reduction gear unit 27 for producing the pulse train (G) which is fed to the control unit 35. In the presence of the pulse train (G) fed to the control unit 35, the control unit 35 produces the command pulse train (C1) having the frequency equal to that of the pulse train (G). The command pulse train (C1) being fed to the stepper motor 8, the stepper motor 8 is driven for rotation and causes the endless conveyor belts 15 to travel at the speed equal to the rotational speed of the outer peripheral surface of the tire-building drum 3. In accordance with the rotation of the stepper motor 8, the suitable drive means operatively connected to one of the belt driving rollers 17 are driven for rotation and causes the endless conveyor belts 18 to travel at the speed equal to that of the endless conveyor belts 15. The endless conveyor belts 15 being thus driven for travel, the strip segment 16 of rubber is conveyed toward the tire-building drum 3 if the strip segment 16 of rubber is supplied on the upper travelling path portions 15a of the endless conveyor belts 15. When the strip segment 16 of rubber breaks the light beam falling upon the light detector 38, the targer sensor 36 produces the output signal which is fed to the control unit 35. In the presence of the output signal fed from the target sensor 36, the measured total length register is adapted to count the number of pulses fed from the pulse signal generator 34 for producing the output signal representative of the measured total length of the strip segment 16 of rubber on the upper travelling path portions 15a of the endless conveyor belts 15.

Figure 5:
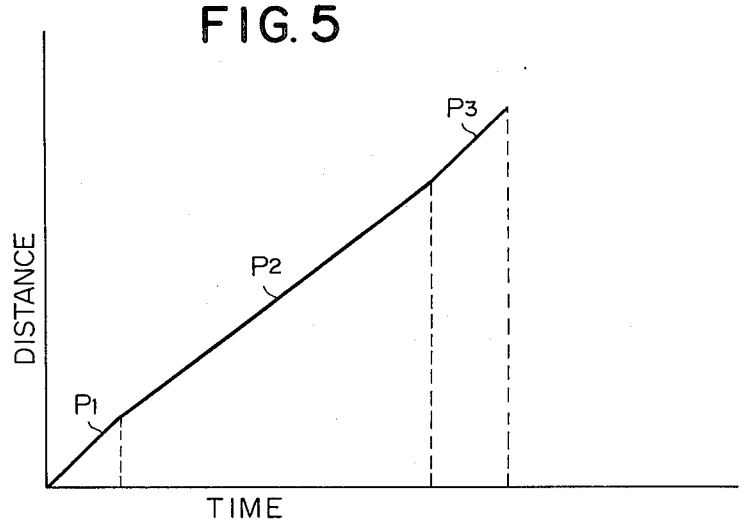
FIG. 5 is a graph showing a distance advancing a strip segment, in terms of time.

In the calculating module forming part of the control unit 35, the differences (A) and (B), the total distance (TD) and, in turn, the ratio (R1) are calculated from the output signals fed from the respective registers and the output signal indicating the predetermined distance (D) as described hereinbefore. If the front end of the strip segment 16 breaks the light beam, the control unit 35 produces the command pulse train (C1) while the strip segment 16 is advancing over a distance equal to the total distance (TD). Consequently, the endless conveyor belts 15 and 18 are driven for travel and causes the strip segment 16 of rubber to advance at a travelling speed equal to the rotational speed of the outer peripheral surface of the tire-building drum 3 over the distance equal to the total distance (TD) for wrapping the front end portion of the strip segment 16 of rubber on the outer peripheral surface of the tire-building drum 3 without producing any elongation as indicated by plot (P1) in FIG. 5. When the strip segment 16 of rubber is advanced over the distance equal to the total distance (TD), the control unit 35 produces the command pulse train (C2) in lieu of the command pulse train (C1).

Assuming that the desired total length, the desired front length and the desired rear length are selected to be 1740 mm, 200 mm and 200 mm, respectively, and that the strip segment 16 on the upper travelling path portions 15a is measured to be 1737 mm in length, the differences (A) and (B) are in the ratio (R1) 3:1340 and as a consequence the frequency of the command pulse train (C2) is decreased into a certain value in which the ratio (R2) is 3:1340.

When the control unit 35 produces the command pulse train (C2), the stepper motor 8 is decreased in rotational speed and causes the endless conveyor belts 15 and accordingly the endless conveyor belts 18 to move with the decreased speeds. This results in that the travelling speed of the strip segment 16 is decreased as indicated by plot (P2) in FIG. 5. The travelling speeds of the strip segment 16 being thus deceased, the intermediate portion of the strip segment 16 of rubber is wrapped on the outer peripheral surface of the tire-building drum 3 in a expanded condition. As a consequence the strip segment 16 of rubber is elongated into a predetermined value of, for example, 1740 mm. The fact that the intermediate portion of the strip segment 16 is wrapped on the outer peripheral surface of the tire-building drum 3 is tantamount to the fact that the pulse signal generator 34 produces the number of pulses equivalent to a certain value of a difference between the output signals fed from the desired total length register and the desired rear length register. When the intermediate portion of the strip segment 16 of rubber is wrapped on the outer peripheral surface of the tire-building drum 3, the control unit 35 produces the command pulse train (C1) in lieu of the command pulse train (C2). In the presence of the command pulse train (C1) fed to the stepper motor 8, the stepper motor 8 is increased in rotational speed and causes the endless conveyor belts 15 and accordingly the endless conveyor belts 18 to move with the speed equal to the rotational speed of the outer peripheral surface of the tire-building drum 3. This result in that the travelling speed of the strip segment 16 is increased as indicated by plot (P3) in FIG. 5. As a consequence the rear end portion of the strip segment 16 is wrapped on the outer peripheral surface of the tire-building drum 3 with a resultant causing the rear end of the strip segment 16 to abut on the front end thereof. The strip segment 16 of rubber being thus wrapped round the tire-building drum 3, the strip segment 16 has no winkles and slack when the front end of the strip segment 16 is jointed to the rear end thereof.

Figure 6:
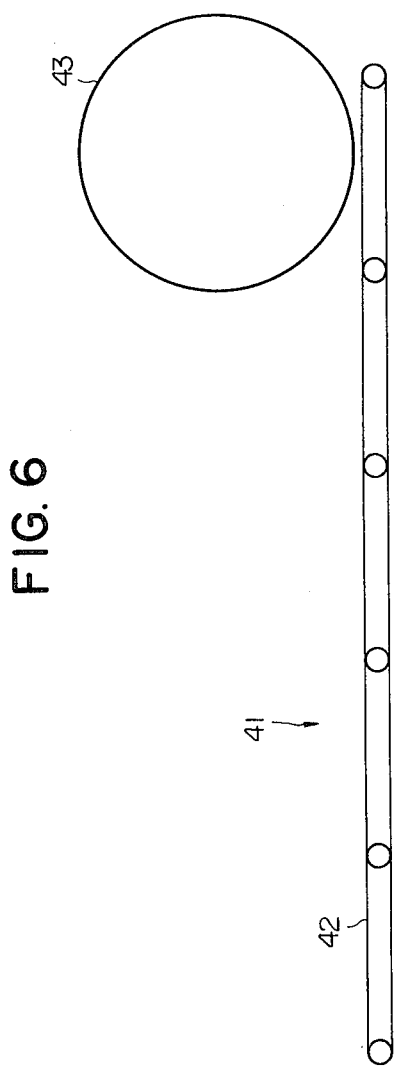
FIG. 6 is a side view showing another embodiment of the arrangement according to the present invention.

In FIG. 6 of the drawings, there is shown another embodiment of the arrangement which is constructed and arranged similarly to the embodiment shown in FIGS. 1 to 4 except for the construction of a transfer device 41. The transfer device 41 is provided with a feed conveyor unit 42 similar in construction to the feed conveyor unit 4 in the embodiment shown in FIGS. 1 to 4. The transfer device 41, however, is not provided with a transfer conveyor unit corresponding to the transfer conveyor unit 6. It is because of the fact that a tire-building drum 43 corresponding to the tire-building drum 3 is located in a position spaced apart upwardly from upper travelling path portions of endless conveyor belts forming part of the feed conveyor unit 42. The upper travelling path portions are, therefore, movable into positions tangential to the outer peripheral surface of the tire-building drum 43 so as to immediately transfer the strip segment of rubber conveyed by the feed conveyor unit 42 to the outer peripheral surface of the tire-building drum 43. In the embodiment described above, the pulse signal generator 34 is connected to the output shaft of the reduction gear unit 27. However, the pulse signal generator 34 may be connected to one of the best driving rollers 13 to produce a pulse train (G') indicating the rotational speed of the belt driving rollers 13. The pulse signal generator 34 being connected to the control unit 35, the rotational speed of the outer peripheral surface of the drum 3 is controlled in accordance with the pulse train (G').

As will have been understood foregoing description, the method according to the present invention is characterized in that a strip segment of resilient material is advanced toward a take-up device at a travelling speed which is substantially equal to the rotational speed of the outer peripheral surface of the take-up device therefor while the front or rear end portion of the strip segment is being wrapped on the outer peripheral surface. The travelling speed is, however, determined in such a manner that a difference between the length of the strip segment and the distance around the outer peripheral surface of the take-up device is reduced to zero value while the intermediate portion of the strip segment is being wrapped on the outer peripheral surface of the take-up device.

Although particular embodiments of the present invention have been shown and described, it will be obvious to those skilled in the art that various changes and modifications may be made without departing from the spirit and scope of the present invention.

What is claimed is:

1. A method of wrapping a strip segment of resilient material around a tire building drum having an outer peripheral surface so that a length of said strip segment and a distance around said outer peripheral surface of said tire building drum become equal with each other, said strip segment of resilient material having a front end portion, a rear end portion and an intermediate portion between the front and rear end portions, comprising the steps of measuring the length of said strip segment of resilient material for calculating the actual difference between the length of the strip segment of resilient material and the distance around the outer peripheral surface of said tire building drum, advancing said strip segment of resilient material at a first speed substantially equal to the rotational speed of the outer peripheral surface of said tire building drum for wrapping the front end portion of the strip segment of resilient material on the outer peripheral surface of said tire building drum, advancing said strip segment of resilient material at a second speed for wrapping the intermediate portion of the strip segment of resilient material on the outer peripheral surface of said tire building drum in an expanded or a contracted condition, said second speed being determined in such a manner that the actual difference between the length of said strip segment and the distance around the outer peripheral surface of said tire building drum is reduced to zero value, and advancing said strip segment of resilient material at a third speed substantially equal to the rotational speed of the outer peripheral surface of said tire building drum for wrapping the rear end portion of the strip segment of resilient material on the outer peripheral surface of said tire building drum and causing the front end of the strip segment of resilient material to abut the rear end of the strip segment.

2. An arrangement for wrapping a strip segment of resilient material around a tire building drum having an outer peripheral surface so that a length of said strip segment and a distance around said outer peripheral surface of said tire building drum become equal with each other, said strip segment of resilient material having a front end portion, a rear end portion and an intermediate portion between the front and rear end portions, comprising:

a transfer device operative to advance said strip segment of resilient material toward said tire building drum at a travelling speed, a measuring device operative to measure the actual length of said strip segment of resilient material and to produce a signal representative of the actual length of the strip segment of resilient material, a signal generating device operative to produce a signal representative of the rotational speed of the outer peripheral surface of said tire building drum, and a control device responsive to said signals respectively representative of the length of said strip segment of resilient material and the rotational speed of the outer peripheral surface of said tire building drum and operative to produce two modes of command signals respectively representative of first and second target travelling speeds of the strip segment of resilient material, said first target travelling speed of said strip segment of resilient material being equal to the rotational speed of the outer peripheral surface of said tire building drum and said second target travelling speed being determined in such a manner that the actual difference between the length of the strip segment of resilient material and the distance around the outer peripheral surface of said tire building drum is reduced to zero value when the strip segment of resilient material is wrapped on the outer peripheral surface of said tire building drum, wherein one of said command signals representative of the first target travelling speed is fed to said transfer device to vary the travelling speed of the strip segment of resilient material to a value substantially equal to that of the first target travelling speed while the front and rear end portions of the strip segment of resilient material are being wrapped on the outer peripheral surface of said tire building drum and wherein the other of said command signals representative of the second target travelling speed of said strip segment of resilient material is fed to said transfer device to vary the travelling speed of the strip segment of resilient material to a value substantially equal to that of the second target travelling speed while the intermediate portion of the strip segment of resilient material is being wrapped on the outer peripheral surface of said tire building drum.

* * * * *